United States Patent Office 3,432,537
Patented Mar. 11, 1969

3,432,537
PROCESS FOR SPLITTING SILANES
Paul Alfred Eugene Guinet and Robert Raphael Puthet, Lyon, Rhone, France, assignors to Rhone-Poulenc S.A., Paris, France, a French body corporate
No Drawing. Filed June 10, 1966, Ser. No. 556,569
Claims priority, application France, June 14, 1965, 20,688
U.S. Cl. 260—448.2                5 Claims
Int. Cl. C07f 7/12, 7/02

The present invention relates to the splitting of the Si—Si bond of polysilanes.

It is known to split Si—Si bonds by various means, e.g., thermal degradation, the action of hydrocarbons in the presence of a Friedel Crafts catalyst, the action of hydrochloric acid, and the action of halogenated hydrocarbons. These processes are of no great industrial interest because their implementation requires too high pressures and temperatures to be economical.

French Patent No. 1,119,915 describes a process for splitting Si—Si bonds by simultaneously using a tertiary organic amine and a halogen hydracid. This process makes it possible to split, at atmospheric pressure and at a moderate temperature of between 75° C. and 150° C., the Si—Si bond of disilanes of overall formula $Si_2X_nR_{6-n}$ in which R represents a hydrocarbon radical, X represents a halogen atom, and $n$ is an integer from 1 to 5. This split takes place according to the following reaction scheme:

Thus, for one mole of disilane, one mole of a silicon compound having a Si—H bond and one mole of another compound having an Si—halogen bond are formed.

During the synthesis of methylhalogenosilanes by the reaction of methyl chloride with a silicon-copper alloy there are formed, in addition to the desired products such as dimethyldichlorosilane, trimethylchlorosilane, methyltrichlorosilane and methyldichlorosilane, products of higher boiling point. These compounds of high boiling point, which form very complex mixtures as described in French Patent No. 1,093,399, comprise in particular methylchlorodisilanes of overall formula $(CH_3)_nSi_2Cl_{6-n}$ in which $n$ may be 0 or an integer from 1 to 6. On splitting with hydrochloric acid in the presence of a tertiary amine, as indicated above, these disilanes give more volatile products, which are extensively used in the manufacture of resins elastomers and organo-silicon oils and fluids.

More specifically, the formation of methyldichlorosilane ($CH_3SiHCl_2$) is highly desirable because of its use in the manufacture of various water-repellants and the possibility of reacting it, via its Si—H bond, with a wide variety of alkenes and alkynes.

It has now been found that the Si—Si bonds of polysilanes, especially halogenated polysilanes, may be broken by subjecting them to the action of a halogen hydracid in the presence of an N,N-disubstituted amide as catalyst. Monosilanes are obtained. The process of the invention accordingly comprises heating a polysilane with a halogen hydracid and an N,N-substituted amide. It will, of course, be understood that the amide must not be one containing groups which will react and interfere with the course of the reaction.

The catalyst used in the new process may be, e.g., an amide of the formula:

in which R represents a hydrogen atom or a saturated or unsaturated hydrocarbon group which may optionally be substituted by halogen atoms or by groups, such as nitro, mercapto, ether or amino groups, which are inert under the working conditions, and R′ and R″, which may be identical or different, represent alkyl or alkenyl radicals (such as methyl, ethyl, propyl, butyl, vinyl, allyl or butadienyl radicals). Particularly suitable amides of this formula are N,N-dimethylformamide, N,N-diethylformamide, N,N-dipropylformamide, N,N-dimethylacetamide and N,N-diethylacetamide.

R and R′ may also jointly form a bivalent radical which may be linear or branched, and whose basic chain may optionally comprise one or more oxygen, sulphur, nitrogen or silicon heteroatoms. In this case, the amides of Formula I are lactams, and suitable such lactams include N-methylpyrrolid-2-one, N-vinylpyrrolid-2-one, N-ethylpyrrolid-2-one, N-propylpyrrolid-2-one, N-alkylcaprolactams and N-alkylvalerolactams, and 1,5-dimethyl-2-phenylpyrazol-3-one.

The catalyst may also be, for example, a polymerisation product of a compound of Formula I in which R″ is a polymerisable vinyl group. Thus there may be used as the catalyst a polyvinylpyrrolidone of formula:

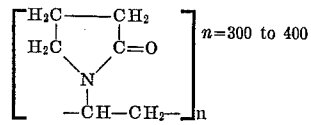

Amides suitable for use in the new process are produced on an industrial scale and hence easily accessible; furthermore, their manipulation is safe because their toxicity is negligible. Against this, the manipulation of tertiary amines is not without danger since these products sometimes cause dermatoses which are difficult to cure.

The halogen hydracid may be hydrogen chloride, hydrogen fluoride, hydrogen bromide, or hydrogen iodide. Hydrogen chloride is preferably used because the polysilanes which are to be split are very frequently methylchlorodisilanes arising from the direct synthesis of chlorosilanes.

In practice, the process of the invention is carried out as follows. The polysilanes are heated in the presence of the amide and the halogen hydracid, generally at atmospheric pressure, which makes it possible to use simple equipment, though pressures below or above atmospheric pressure are not ruled out. The amount of amide used may vary between wide limits, e.g. from 0.01% to 10% by weight based on the weight of polysilane treated. Amounts between 0.1% and 1% are generally sufficient. The reaction temperature is not critical, and may vary from 70° and 200° C.

The halogen hydracid is introduced from the start of heating the polysilane/catalyst mixture. When the amide hydrochloride has properly formed and the reaction temperature has been reached, the volatile products formed by splitting of the Si—Si bond are removed by distillation and the reaction continues until the polysilanes have totally disappeared. The halogen hydracid may be used in the theoretical amount relative to the number of Si—Si bonds to be split, or in slight excess. A 1% to 10% excess is generally adequate. If the starting material is a pure alkylhalogenopolysilane, the reaction is practically quantitative.

An especially common starting material suitable for treatment by the process is the fraction distilling between 120° and 170° C. at normal atmospheric pressure, which arises from the distillation residues of chlorosilanes prepared by direct synthesis, and contains only 80% to 90% of pure methylchlorodisilanes. The degree of conversion based on these fractions is necessarily less than 100% and there remains in the reactor, after distillation of the volatile splitting products, a residue of non-splittable products which contain no further Si—Si bonds.

The working conditions for the splitting reaction are simple and the process can be easily carried out continuously in an uncomplicated low cost apparatus. For example, a simple glass reactor with stirrer, distillation column and inlet tubes for the silanes and the halogen hydracid may be used. Continuous operation is simple. First of all, the reaction is started by introducing the halogen hydracid into a disilane composition containing the catalyst and heated to a temperature between 70° C. and 160° C. When the reaction has been started in this way, the splitting products distil, and it suffices to keep the volume of reaction mixture in the flask constant by continuous addition of fresh disilane. The monosilane products may be used as such or may be separated by fractionation.

Generally no solvent is used, whether the reaction is carried out continuously or discontinuously, but the reaction is not adversely affected by the presence of a solvent such as toluene, xylene, cumene, ortho-dichlorobenzene, chlorobenzene or diphenyl ether. There may be an advantage in working in a solvent medium if the amide hydrochloride is very volatile and there is a risk of it blocking the distillation column, or if the polysilanes to be split are not pure and contain substances of high boiling point. In the latter case the use of the solvent lowers the temperature of the reaction mixture and the disilanes are completely split without risk of degradation of the residue and of the catalyst by excessive heating.

The process of the invention makes it possible to prepare methyl halogenosilanes of the type $FSiCl_2CH_3$ or $BrSiCl_2CH_3$, but these products are in fact of little commercial interest at present and are used principally in the laboratory.

With the methylchlorodisilanes obtained as byproducts of the manufacture of methylchlorosilanes by direct synthesis, splitting with hydrogen chloride according to the process of the present invention yields a high percentage of the following three products: methyldichlorosilane, dimethyldichlorosilane and methyltrichlorosilane.

The following examples illustrate the invention.

EXAMPLE 1

The apparatus consists of a 1 litre flask equipped with a stirrer, a thermometer, and an inlet tube for anhydrous hydrogen chloride topped by a distillation column filled with glass rings. The upper part of this column carries a total reflux analyser, which is connected to a descending condenser ending in a 500 ml. receiver flask, followed by a trap dipping into a Dewar flask filled with a solid carbon dioxide acetone mixture and then by a bubble counter and a safety tube.

640 g. of crude disilanes boiling between 120° and 160° C. at normal atmospheric pressure, arising from distillation residues of chlorosilanes, prepared by the reaction of methyl chloride with a silicon/copper alloy, and having the following characteristics: content of hydrolysable chlorine, about 55% by weight; content of silicon, about 24.5% by weight; and consisting principally of disilanes of overall formulae $Cl_4Si_2Me_2$ and $Cl_3Si_2Me_3$, are placed in the flask. 6.4 g. of N,N-diethylformamide are added, and this mixture is then progressively heated to 140° C. whilst a slow current of anhydrous hydrogen chloride is introduced into the mixture. At 140° C., vapours form which condense in the analyser, and the condensed product is returned to the flask. The temperature in the vapour at the head of the column is 56° C. After 30 minutes running under these conditions, the temperature of the mixture falls from 140° C. to 127° C., and the supply of hydrogen chloride to the mixture at a rate of 15 to 20 g./h. is continued.

The distillate is then withdrawn from the analyser at the rate of 150 to 200 ml./hour. Throughout the operation the temperature at the head of the column remains at about 56–58° C., whereas in the mixture in the flask the temperature continues to fall, declining in 2 hours 30 minutes from 127° to 110° C., and then rising again in 2 hours 30 minutes from 110° to 150° C.

A total of 92 g. of anhydrous hydrogen chloride are introduced, and 644 g. of distillate and 83 g. of residue are obtained. The distillate contains the following, in percent by weight, determined by vapour phase chromatography:

| | Percent |
|---|---|
| $CH_3SiHCl_2$ | 40.6 |
| $(CH_3)_3SiCl$ | 2 |
| $Cl_3SiCH_3$ | 36.6 |
| $(CH_3)_2SiCl_2$ | 20.8 |

EXAMPLE 2

The apparatus is as in Example 1, but provided with an inlet for disilanes into the flask supplied continuously by a metering pump. 700 g. of crude disilanes similar to those of Example 1, and 10.5 g. of N,N-diethylformamide are initially placed in the flack. The reaction mixture is heated as in Example 1 to 140° C. whilst hydrogen chloride is constantly bubbled in, and heating is continued for 30 minutes at this temperature whilst the volatile products which condense at the head of the column are refluxed. During this period the temperature of the mixture falls from 140° C. to 127° C.

Progressive withdrawal of the products which distil is then started, whilst fresh disilanes are continuously introduced by means of the metering pump at a rate such that the volume of liquid in the flask remains constant. The feed of crude disilanes is 150 to 200 ml./hour whilst the delivery of hydrogen chloride is about 28 g./hour. At the end of 2 hours the temperature of the mixture has fallen from 127° to 100° C.; it remains between 100 and 110° C. for the next 20 hours and then rises again in 5 more hours from 110° to 129° C. The feed of disilanes is then stopped, but heating and introduction of hydrogen chloride is continued for a further 1 hour in order to split the disilanes still present in the flask. At the end of the operation the temperature in the flask reaches 135° C. Throughout the operation the temperature in the vapour at the head of the column remains at about 57–59° C.

The operation, which is thus carried out on a total of 5000 g. of crude disilanes and requires 800 g. of anhydrous hydrochloride, yields 5108 g. of monosilanes and a residue weighing 605 g.

The 5108 g. of monosilanes collected consist of:

| | Percent by weight |
|---|---|
| $CH_3SiHCl_2$ | 35.8 |
| $(CH_3)_3SiCl$ | 3 |
| $Cl_3SiCH_3$ | 40.6 |
| $Cl_2Si(CH_3)_2$ | 20.6 |

EXAMPLE 3

700 g. of crude disilanes similar to those of Example 1, and 7 g. of N-methylpyrrolid-2-one are placed in the same apparatus as that described in Example 1. The procedure followed is the same as in Example 1. The temperature in the flask rises to 145° C. at the beginning and then falls again to 137° C. At that point, collection of the distillate is started whilst the temperature continues to fall to 114° C. in the flask, and then rises again to 160° C. at the end of the operation. 722 g. of distillate and 73 g. of residue are obtained. The distillate contains the following in percent by weight:

| | Percent |
|---|---|
| $CH_3SiHCl_2$ | 43 |
| $(CH_3)_3SiCl$ | 2.3 |
| $Cl_3SiCH_3$ | 39 |
| $Cl_2Si(CH_3)_2$ | 15.7 |

The amount of anhydrous hydrogen chloride used in this experiment is 95 g.

EXAMPLE 4

In this example, N-methyl-pyrrolid-2-one is used as the catalyst and the operation is carried out continuously using the same working conditions as in Example 2. The initial charge consists of 700 g. of crude disilanes similar to those utilised previously, and 10.5 g. of N-methylpyrrolid-2-one.

The temperature in the flask is raised at the beginning to 146° C. and then falls to 120° C. at which point collection of the distillate is started. The flask is then continuously fed with disilanes by the metering pump, and the volatile products formed are continuously distilled off. After 27 hours running in this way, during the course of which the temperature of the reaction mixture remains at about 115°–120° C., the metering pump is stopped and the mixture heated for 15 minutes, still in the presence of hydrogen chloride, so as to split the last traces of disilanes. In this latter phase the temperature of the mixture again rises to 130° C. A total of 5000 g. of crude disilanes are treated, using 780 g. of hydrogen chloride, and 4763 g. of distillate and 857 g. of residue were obtained.

The distillate contains the following in percent by weight:

| | Percent |
|---|---|
| $CH_3SiHCl_2$ | 32.9 |
| $Cl_3SiCH_3$ | 38.8 |
| $(CH_3)_2SiCl_2$ | 28.3 |

EXAMPLE 5

700 g. of crude disilanes similar to those of example 1, and 7 g. of N-vinylpyrrolid-2-one are placed in the apparatus described in Example 1. The process is carried out as in Example 1. The temperature rises to 150° C. in the flask and then falls again. When it has fallen to 120° C. collection of the distillate is started. The temperature of the flask then rises again and reaches 170° C. at the end of the operation. In this way, 102 g. of hydrogen chloride were used and 731 g. of distillate collected. 72 g. of residue remain in the flask. The distillate contains the following in percent by weight:

| | Percent |
|---|---|
| $CH_3SiHCl_2$ | 37.8 |
| $(CH_3)_3SiCl$ | 2 |
| $Cl_3SiCH_3$ | 41.2 |
| $(CH_3)_2SiCl_2$ | 19 |

EXAMPLE 6

700 g. of crude disilanes similar to those of Example 1, and 7 g. of polyvinylpyrrolidone of mean molecular weight about 40,000 are placed in the same apparatus as in Example 1. The process is carried out as in Example 1. The temperature, initially raised to 140° C. in the flask, falls to 119° C., and collection of the distillate is then started. It is stopped when the temperature in the flask has risen to 170° C. In this way, 50 g. of hydrogen chloride were used in 3 hours, and 588 g. of distillate collected. 167 g. of residue remain.

The distillate contains the following in percent by weight:

| | Percent |
|---|---|
| $CH_3SiHCl_2$ | 28.5 |
| $(CH_3)_3SiCl$ | 2.2 |
| $Cl_3SiCH_3$ | 48 |
| $(CH_3)_2SiCl_2$ | 21.3 |

EXAMPLE 7

700 g. of disilanes similar to those of Example 1. 7 g. of N,N-dimethylformamide, and 105 g. of orthodichlorobenzene as solvent, are placed in the apparatus of Example 1. The reaction is carried out as in Example 1. The temperature in the flask initially reaches 140° C., falls again to 116° C. after 30 minutes heating, and rises again while the distillate formed is collected. At the end of the operation the temperature in the flask is 150° C. 80 g. of hydrogen chloride are used in 4 hours, and 643 g. of distillate collected. 186 g. of residue (orthodichlorobenzene and non-volatile organo-silicon compounds) remain.

The distillate contains the following in percent by weight:

| | Percent |
|---|---|
| $CH_3SiHCl_2$ | 39.6 |
| $(CH_3)_3SiCl$ | 2.1 |
| $Cl_3SiCH_3$ | 38 |
| $(CH_3)_2SiCl_2$ | 20.3 |

EXAMPLE 8

800 g. of crude disilanes similar to those of Example 1, and 8 g. of 1,5-dimethyl-2-phenylpyrazol-3-one are introduced into the apparatus of Example 1. The mixture is heated, and the reaction starts at about 110° C. The temperature then falls from 110° C. to 97° C., and volatile products are then distilled (boiling point 58° to 60° C.). During this period, which lasts 5 hours, the temperature of the mixture rises from 97° to 160° C. In this experiment, 120 g. of hydrogen chloride are used and 768 g. of distillate are collected; 152 g. of residue remain.

The distillate contains the following in percent by weight:

| | Percent |
|---|---|
| $CH_3SiHCl_2$ | 32.7 |
| $(CH_3)_3SiCl$ | 2.1 |
| $Cl_3SiCH_3$ | 40.3 |
| $(CH_3)_2SiCl_2$ | 24.4 |

EXAMPLE 9

700 g. of crude disilanes similar to those of Example 1, and 7 g. of 1,5-dimethyl-2-phenylpyrazol-3-one are introduced into the apparatus of Example 1. This mixture is heated in the absence of hydrogen chloride to 104° C. At that point vapours are evolved and condense in the condenser (the temperature of the vapours at the head of the condenser being 64° C.). The heating is continued for 30 minutes under total reflux, during which period the temperature in the flask falls from 104° to 96° C., followed by 2 hours 15 minutes during which the material which distils is collected. During this distillation period the temperature in the flask rises from 96° to 160° C. 350 g. of distillate are thus collected, and these contain the following by weight:

| | Percent |
|---|---|
| $CH_3SiHCl_2$ | 0.6 |
| $(CH_3)_3SiCl$ | 1.7 |
| $Cl_3SiCH_3$ | 51 |
| $(CH_3)_2SiCl_2$ | 46.7 |

Anhydrous hydrogen chloride is then introduced into the residue which remains, whilst the mixture is heated to a temperature of 160° to 180° C. and the volatile products, having a boiling point of about 57° C. are distilled for 5 hours. 170 g. of distillate are collected, containing the following in percent by weight:

| | Percent |
|---|---|
| $CH_3SiHCl_2$ | 42.6 |
| $Cl_3SiCH_3$ | 51.1 |
| $(CH_3)_2SiCl_2$ | 6.3 |

In this experiment, 40 g. of anhydrous hydrogen chloride are used.

We claim:
1. Process for splitting silicon-silicon bonds in polysilanes which comprises heating a polysilane with hydrogen halide and an N,N-disubstituted amide.
2. Process according to claim 1 in which the polysilane has the formula:

$$(CH_3)_n Si_2 Cl_{6-n}$$ 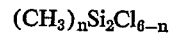

in which $n$ is 0 or an integer from 1 to 6.

3. Process according to claim 1 in which the reaction is carried out at 70° to 200° C.

4. Process according to claim 1 in which the hydrogen halide is hydrogen chloride.

5. Process according to claim 1 in which the N,N-disubstituted amide is N,N-diethylformamide, N-methyl-pyrrolid - 2 - one, N-vinylpyrrolid-2-one, polyvinylpyrrolidone, N,N-dimethylformamide, or 1,5 - dimethyl-2-phenyl-pyrazol-2-one.

References Cited

UNITED STATES PATENTS

| 2,598,435 | 5/1952 | Mohler et al. | 260—448.2 |
| 2,842,580 | 7/1958 | Gilbert et al. | 260—448.2 |
| 3,322,511 | 5/1967 | Weyenberg | 260—448.2 XR |

TOBIAS E. LEVOW, *Primary Examiner.*

J. P. PODGORSKI, *Assistant Examiner.*

U.S. Cl. X.R.

23—87, 366